United States Patent
Nann et al.

(10) Patent No.: US 9,944,411 B2
(45) Date of Patent: Apr. 17, 2018

(54) SATELLITE WITH VARIABLE MASTER CROSS SECTION

(71) Applicants: THALES, Courbevoie (FR); CENTRE NATIONAL D'ETUDES SPATIALES, Paris (FR)

(72) Inventors: Isabelle Nann, Cannes la Bocca (FR); Nicolas Mosson, Toulouse (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 80 days.

(21) Appl. No.: 14/791,083

(22) Filed: Jul. 2, 2015

(65) Prior Publication Data
US 2016/0001896 A1 Jan. 7, 2016

(30) Foreign Application Priority Data
Jul. 4, 2014 (FR) ..................................... 14 01506

(51) Int. Cl.
*B64G 1/10* (2006.01)
*B64G 1/44* (2006.01)

(52) U.S. Cl.
CPC ............. *B64G 1/1007* (2013.01); *B64G 1/10* (2013.01); *B64G 1/443* (2013.01); *B64G 2001/1092* (2013.01)

(58) Field of Classification Search
CPC .......... B64G 2001/1092; B64G 1/1007; B64G 1/443; B64G 1/10
See application file for complete search history.

(56) References Cited

U.S. PATENT DOCUMENTS

| | | | |
|---|---|---|---|
| 5,755,406 A * | 5/1998 | Aston | B64G 1/1007 244/159.4 |
| 5,833,175 A * | 11/1998 | Caplin | B64G 1/10 244/158.1 |
| 5,839,696 A * | 11/1998 | Caplin | B64G 1/10 244/118.2 |
| 8,448,902 B2 | 5/2013 | Gelon | |
| 2003/0057328 A1 | 3/2003 | Maruno et al. | |
| 2010/0020742 A1 | 1/2010 | Goodzeit et al. | |
| 2013/0099059 A1* | 4/2013 | Cheynet De Beaupre | B64G 1/10 244/158.1 |

* cited by examiner

*Primary Examiner* — Brian M O'Hara
(74) *Attorney, Agent, or Firm* — Baker & Hostetler LLP

(57) ABSTRACT

A satellite comprises at least one first communication module, a repeater module, one or more antennas, at least one propulsion module and an avionics module, the repeater module comprising: a north first panel when the satellite is in an orbital position, an east second panel, a south third panel and a west fourth panel arranged respectively opposite the north first panel and the east second panel, the north panel and the south panel having widths $Xmc_R$ in the east-west direction, the east panel and the west panel having a width or $Ymc_R$ in the north-south direction; characterized in that: the value of the ratio $Xmc_R/Ymc_R$ for the repeater module lies within the interval [0.84; 1.12], and the repeater module consists of a number of floors, and the value of Xmck varies as a function of the floor k and of its position in the repeater module.

8 Claims, 5 Drawing Sheets

SATELLITE WITH VARIABLE MASTER CROSS SECTION

CROSS-REFERENCE TO RELATED APPLICATION

This application claims priority to foreign French patent application No. FR 1401506, filed on Jul. 4, 2014, the disclosure of which is incorporated by reference in its entirety.

FIELD OF THE INVENTION

The invention relates to a satellite with variable master cross section. It is used, for example, in the field of communication satellites, and/or observation satellites.

BACKGROUND

In the present invention, the expression "master cross section" describes an area seen when looking at the satellite along an axis Z as defined in FIG. 1.

FIG. 1 schematically represents a satellite 100 stabilized in an orbital configuration and relative to a conventional tri-axial reference frame, x, y, z. The axis X corresponds to the roll, the axis Y to the pitch and the axis Z to the yaw. The axis Z, conventionally, is defined as a line passing through the centre of gravity of the satellite and the centre of gravity of the Earth, the roll axis X is defined as an axis at right angles to the axis Z in the plane of the orbit and in the direction of the speed vector of the satellite and the pitch axis Y is defined as the normal to the orbit plane, the three axes forming a direct orthogonal reference frame. The satellite 100 is made up of a body 110 having a rectangular cubic form. A first panel 120, orthogonal to the axis Y corresponds to the north panel when the satellite is in an orbital position, and will be referenced "north" panel. A second panel 150 orthogonal to the axis X can be referenced "east" panel. A third panel 140 or "south" panel and a fourth panel 130 or "west" panel are arranged respectively opposite the north first panel 120 and the east second panel 150. The north panel and the south panel have widths $L_{EO}$ in the east-west direction which can correspond substantially to the distance Xmc between the east/west panels (FIG. 4), and the east panel and the west panel have a width $L_{NS}$ in the north-south direction corresponding substantially to a distance Ymc (FIG. 4) between the north panel and the south panel. The two north and south panels can have extensions which extend beyond the east and west panels.

The body of the satellite can include the equipment necessary for the defined operation or to the mission. The satellite is, for example, made up of the following modules, FIG. 2:
- a payload module 200 which is made up of an antenna module 210, a repeater module 220 and panels bearing the thermal radiators, not represented, the lateral antennas 230, and the appendages necessary to the mission,
- a service module 240 which is made up of one or more propulsion modules 250, an avionics module 260 known to those skilled in the art,
- one or more solar modules or panels 270.

FIG. 2 represents the satellite positioned on a support 280 in a launch vehicle 290 in a launch configuration known to those skilled in the art.

When the body dimensions are defined for a launch platform, they remain fixed for all the satellites of the range and for all the satellites built from a range point. For example, all the platforms of Thales Alenia Space called "spacebus" have a master cross section of 2.2*2.0 m² regardless of the envisaged mission.

In order to optimize the cost of the equipment, there is therefore currently a need to have a satellite which makes it possible to have better trade-off between the outer fitting surface, the fitting surface of the repeater and the radiative surface and which could be launched from conventional launch devices.

One way of proceeding which is known from the prior art consists in changing range point or satellite size, when one of the three following elements cannot be optimized satisfactorily: 1) the outer fitting surface of the satellite, 2) the north/south fitting surface of the repeater module and 3) the radiative surface. This way of proceeding considerably increases the cost and may necessitate the use of a larger capacity launch vehicle.

The patent U.S. Pat. No. 8,448,902 describes a satellite 300 (FIG. 3) positioned in a launch vehicle 310 and which consists of at least two modules 320, 330, each module comprising four faces supporting, for some, the antennas and the solar panels. The first module is configured with a first ratio $R_1$ of width $L_{EO}/L_{NS}$, the second module 330 with a second ratio $R_2$ of width $L_{EO}/L_{NS}$, and the value of $R_2$ is at least 20% greater than the value of $R_1$. The expression "floor panel" or "floor" denotes one and the same element, known as "floor" in the following description.

SUMMARY OF THE INVENTION

The invention relates to a satellite comprising at least one first communication module, a repeater module, one or more antennas, at least one propulsion module and an avionics module, the repeater module comprising at least:
- a "north" first panel when the satellite is in an orbital position,
- an "east" second panel,
- a "south" third panel and a "west" fourth panel arranged respectively opposite the "north" first panel and the "east" second panel,
- the "north" panel and the "south" panel having widths $Xmc_R$ in the east-west direction, the east panel and the "west" panel having a width or $Ymc_R$ in the north-south direction, wherein:
- the value of the ratio $Xmc_R/Ymc_R$ for the repeater module lies within the interval [0.84; 1.12], and
- the repeater module consists of several floors and the value of Xmck varies as a function of the floor k and its position in the repeater module.

A floor has, for example, a first dimension Xmckg and a second dimension Xmckd, which are different, for each of its sides taken in the east-west direction.

The dimension Xmck can be positioned relative to an axis of symmetry of the side of the positive values or of the negative values while verifying a given value $Xmc_R$.

According to a variant embodiment, the value $Ymc_R$ is equal to 2.5 m and the value of $Xmc_R$ varies between 2.1 and 2.8 m.

The dimensions for the service module can be as follows: Xmc equal to 2.4 m and Ymc to 2.5 m.

The antennas can be arranged when the satellite is in an orbit configuration in an east-west direction with respect to the repeater module.

The satellite can comprise solar panels arranged in proximity to the south and north faces in the launch phase.

The solar panels are, for example, deployed in a north or south direction in an orbital configuration relative to the modules forming the satellite.

BRIEF DESCRIPTION OF THE DRAWINGS

Other features and advantages of the present invention will become more apparent on reading the following description of exemplary embodiments given for illustrative and nonlimiting purposes with attached figures of which.

DETAILED DESCRIPTION

An exemplary embodiment will now be given in an illustrative and nonlimiting manner to give a better understanding of the object of the present invention. The idea of the present invention consists notably in proposing a satellite that has a master cross section of the repeater module of the satellite that can be adapted to a given mission. One of the objectives is to have more or less north/south radiative surface and more or less antenna fitting surface on east/west faces as a function of the mission. The size and the number of the antennas necessary to complete the mission are previously known parameters.

Figure 4:
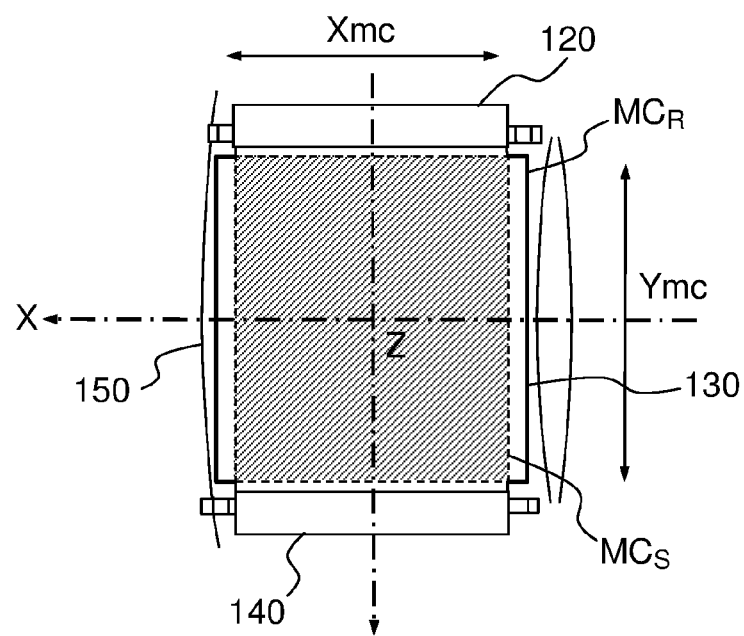
FIG. 4 represents a representation of the master cross section.

FIG. 4 shows two dimensions defining the master cross section on the abovementioned axes X and Y. As indicated previously, the master cross section of the satellite is the surface seen when looking at the satellite on the axis Z. The dimension Xmc corresponds to the distance separating an "east" panel 150 from a "west" panel 130. The dimension Ymc corresponds to the distance separating a "north" panel 120 and a "south" panel 140. The repeater module has a surface $MC_R$ (solid lines) and the service module a surface $MC_S$ (dotted lines).

Figure 5:
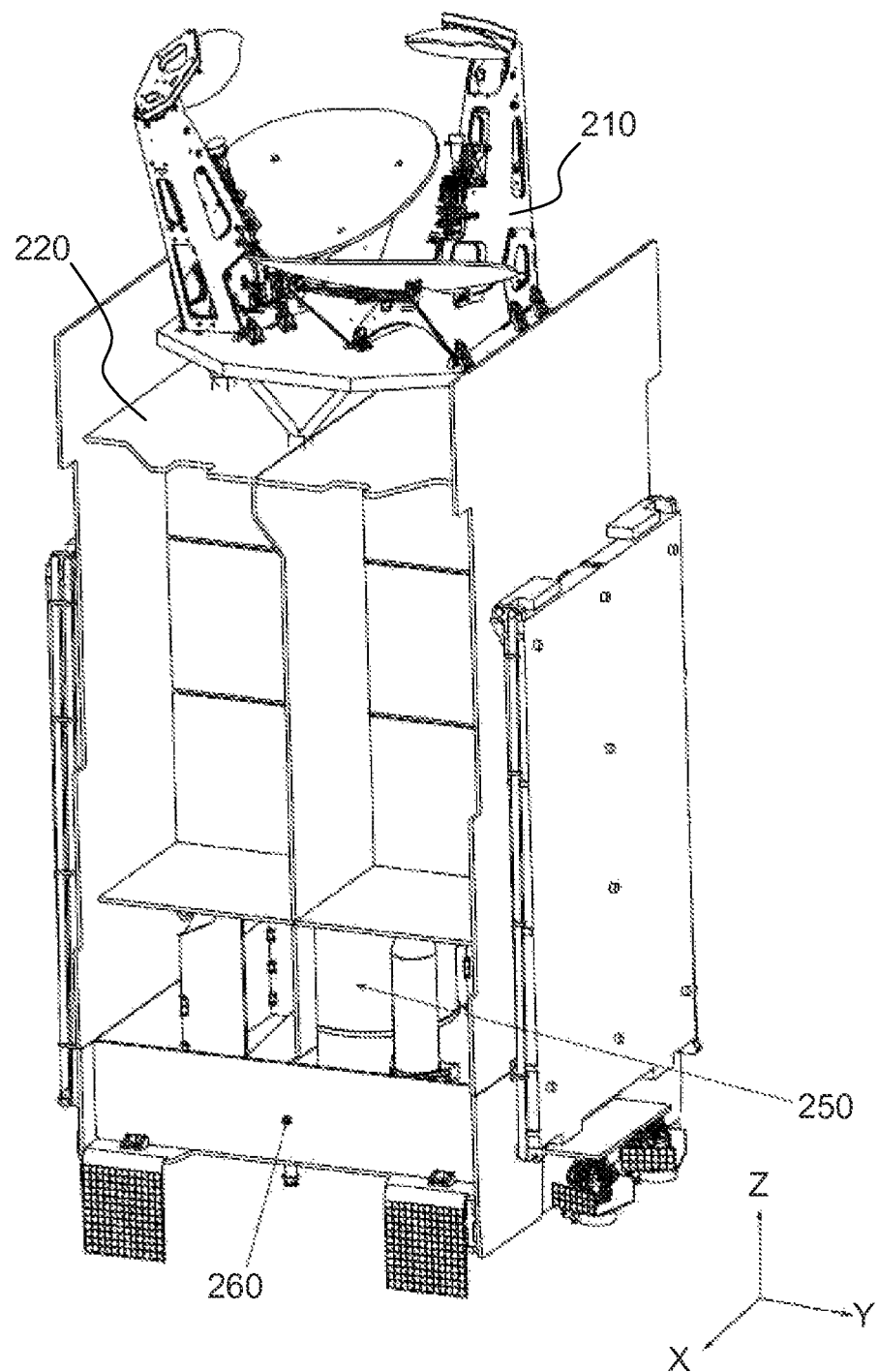
FIG. 5 represents an exemplary embodiment of a satellite according to the invention.
Figure 6A:
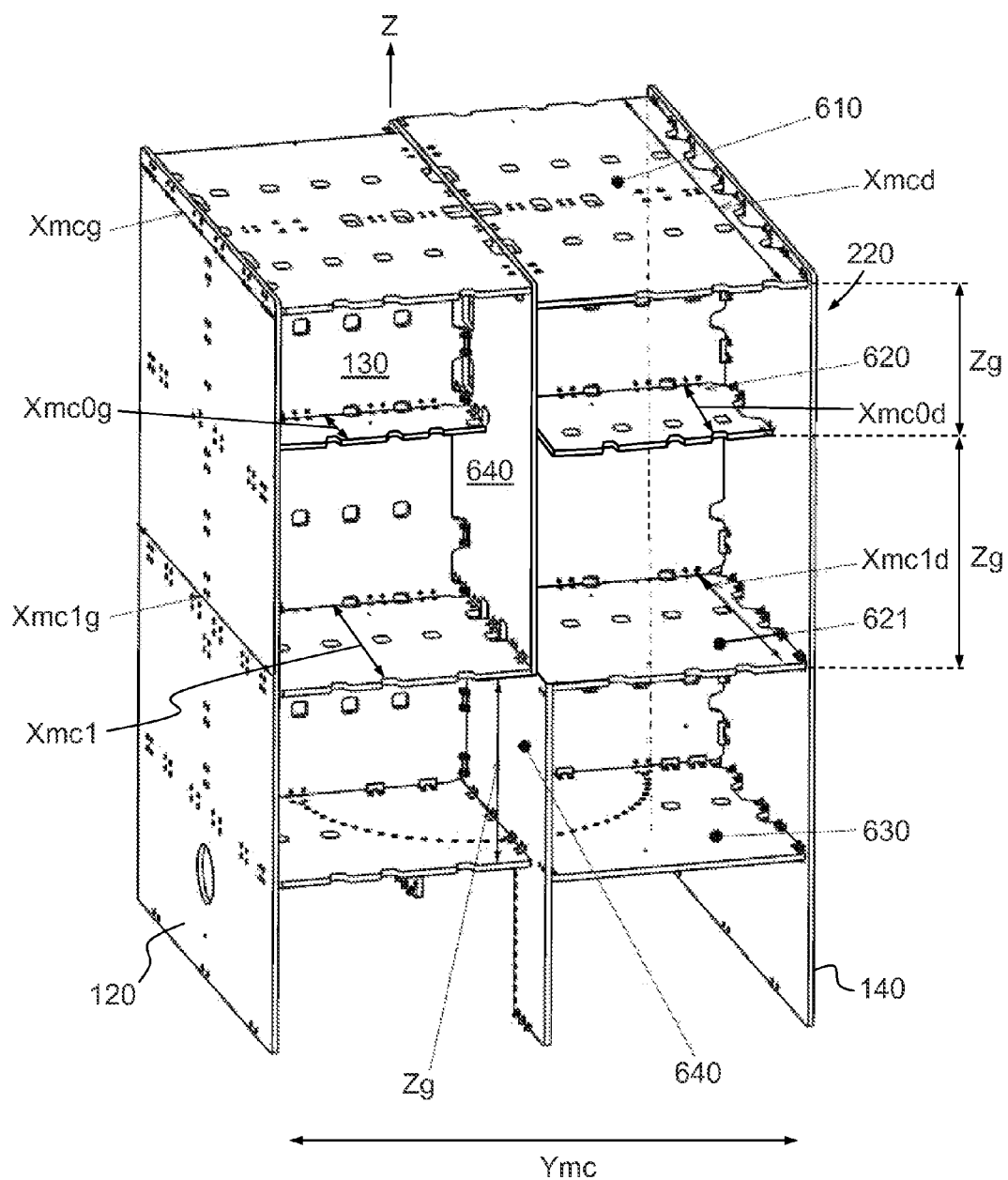
FIG. 6A represents an example of a repeater module having a master cross section that is variable as a function of the position of a floor.

FIG. 5 schematically represents an exemplary embodiment of a satellite comprising an antenna module 210, a repeater module 220 whose structure is detailed in FIG. 6A, a propulsion module 250 and an avionics module 260.

FIG. 6A schematically represents a substantially rectangular cubic repeater module 220 consisting of a north first panel 120, an "east" second panel 150 (not represented for the purposes of simplification of the figure), a "south" third panel 140 and a "west" fourth panel 130. The repeater module also comprises a top floor first panel 610, two intermediate floor panels 620, 621 in this exemplary embodiment and a bottom floor panel 630. A central wall 640 divides into two parts the space E formed by two floors 610, 620; 620, 621; 621, 630 and two north/south panels, 120, 140.

Figure 1:
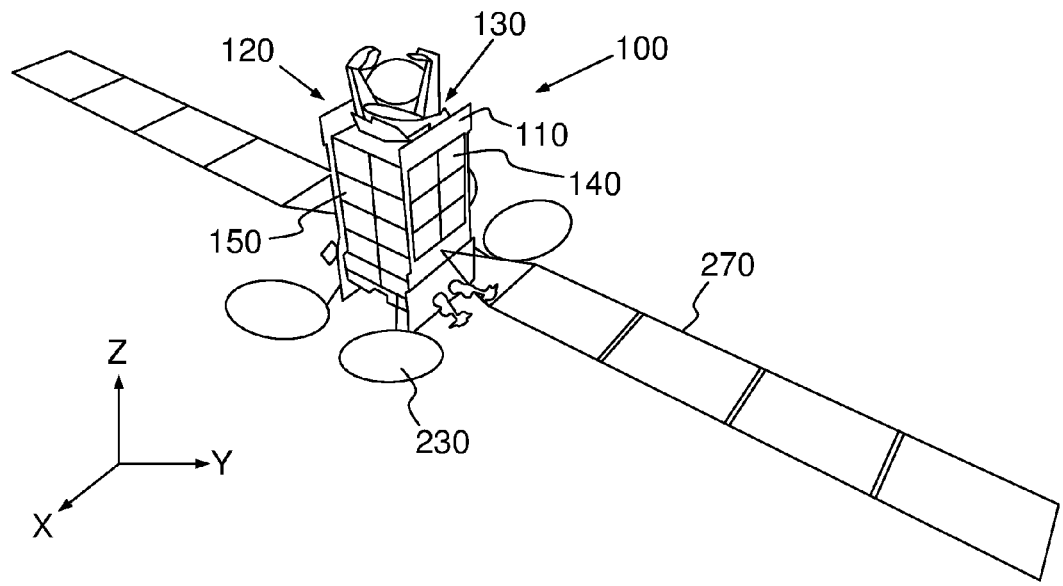
FIG. 1 represents a diagram of a satellite in orbit.
Figure 2:
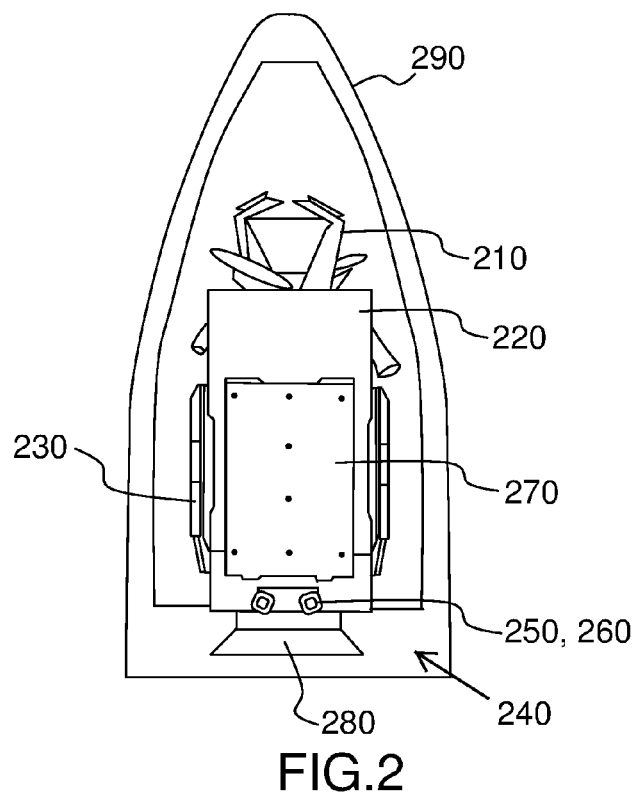
FIG. 2 represents a diagram of the satellite at launch.
Figure 3:
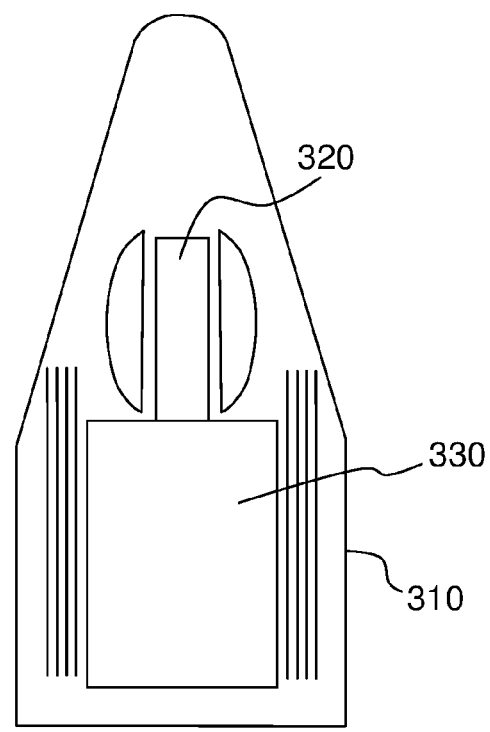
FIG. 3 represents an example of a satellite according to the prior art.

The master cross section $MC_S$ of the service module 220 (FIG. 1) is defined by the surface of its bottom wall situated under the satellite (face-Z). The master cross section of the service module $MC_S$ is generally fixed. The dimension Xmcs is for example equal to 2.4 m and the dimension of Ymcs to 2.5 m.

The master cross section of the repeater module $MC_R$ is variable, in order to be able to adapt this module to the size of the antennas or to the lateral appendages needed for the correct operation of the mission.

The parameter $Ymc_R$ for the master cross section of the repeater module is for example fixed at 2.5 m and corresponds to the distance between the north panel 120 and the south panel 140. The parameter $Xmc_R$ for the master cross section of the repeater module is variable and can lie, for example, between 2.1 and 2.8 m. This value $Xmc_R$ can be different for each of the floors forming the repeater module.

For the repeater module, the value of the ratio of the parameters $Xmc_R/Ymc_R$ will be chosen within the interval varying from 0.84 to 1.12.

In FIG. 6A, the dimension Xmc is indicated taken in the width or east-west direction 150, 130, for each of the floors which varies notably as a function of its placement in the satellite. In the case where the intermediate floor 621 is considered, the latter can have a single dimension Xmc1 in its width taken in the east-west direction, or even a first dimension Xmc1d corresponding to the width for the half-floor on the right side relative to the plane of the figure, and a second dimension Xmc1g for the left side taken in the direction X. The letter d indicates the right side, g the left side with the figure in front of it. The same applies for the floor 620 which takes a dimension Xmc0 or even two dimensions Xmc0d, Xmc0g. The floors are separated by distance intervals Zf considered along the axis Z that can vary as a function of the mission, for example between 0.5 m and 1.5 m.

More generally, a floor of index k has at least one dimension Xmck such that the ratio Xmck/Ymck belongs to the interval [0.84, 1.12], with Ymck the dimension in the north-south direction. Such an arrangement makes it possible notably to fit out the satellite according to the mission, the number of antennas, the antenna dimensions, etc.

The number of floors is, for example, at least equal to three.

The example given in FIG. 6A for the arrangement of the floors is at the level of the east panel, but remains valid for the opposite west panel.

Some examples of floor positioning relative to the origin point in the reference frame X, Y, Z are now given.

Figure 6B:
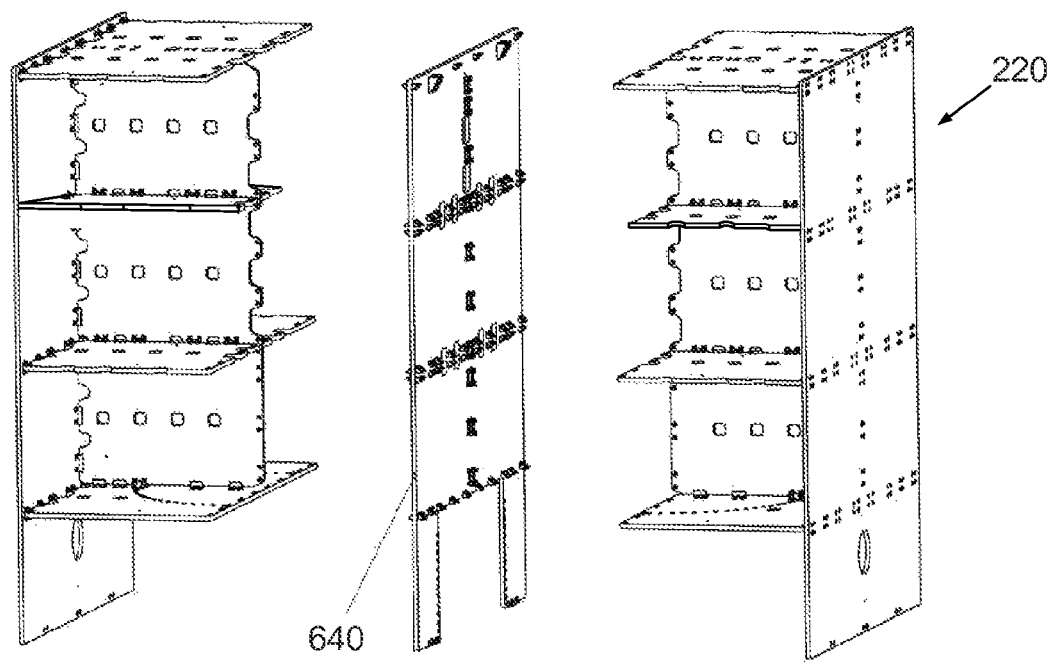
FIG. 6B represents a possible assembly.

FIG. 6B schematically represents one possibility for producing the assembly of the repeater module.

Figure 7:
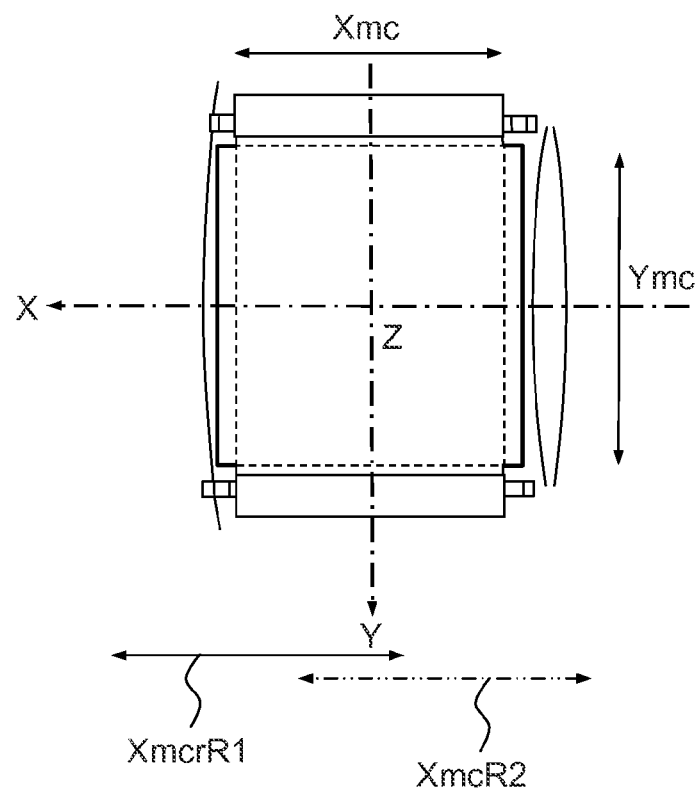
FIG. 7 represents a diagram showing different possibilities for the positioning of the floors relative to a median axis.

FIG. 7 represents a few examples of shift in the positioning of the floors. For example, the value of $Xm_{CR1}$ is shifted more to the +Xmc side and the value of $Xm_{CR2}$ is shifted more to the −Xmc side.

The propulsion module or modules with which the satellite is equipped are, for example, of conventional chemical type, Arcjet chemical type, or even of electric/xenon plasma propulsion type.

The antennas used will, for example, be deployed when the satellite is in orbit.

The thermal radiators will, preferably, be arranged on the outer surfaces of the north/south/east/west panels and interconnected, if necessary, by means conventionally used in the field.

The satellite according to the invention will for example be built by defining, a priori a number of repeater module structure options. It will be possible to envisage a number of given values Xmc, for example 2.1 m, 2.3, 2.5 and 2.8 m.

According to another way of proceeding, the structure of the repeater module will be defined in parametric form using computer-assisted design and manufacture models parameterized with the parameter Xmc on the different intervals between floors. The parameters XmcR will be adjusted for each satellite built, with updating of the files, form of the panels, etc.

The characteristics given for the repeater module apply also in the case of a satellite comprising more than four panels, for example 6 or 8 panels.

Advantages

One of the advantages offered by the satellite with variable master cross section according to the invention is that it makes possible to configure the satellite to adapt it to conventional launch vehicles.

The invention claimed is:

1. A satellite comprising:
   at least one first communication module;
   a repeater module;
   one or more antennas;
   at least one propulsion module; and
   an avionics module,
   wherein the repeater module comprises at least the following elements:
      a north panel when the satellite is in an orbital position,
      an east panel,
      a south panel arranged opposite of the north panel,
      a west panel arranged opposite of the east panel, and
      a plurality of floors, each having a width in the east-west direction,
   the north panel and the south panel having a width $Xmc_R$ in the east-west direction, and the east panel and the west panel having a depth $Ymc_R$ in a north-south direction, the width $Xmc_R$ being different than the depth $Ymc_R$ and a ratio $Xmc_R/Ymc_R$ being within an interval [0.84; 1.12], and the widths of the plurality of floors having at least three different dimensions and varying along the repeater module to define a variable master cross-section of the repeater module, the variable master cross-section defined by the north panel, the east panel, the south panel, the west panel, and the plurality of floors.

2. The satellite according to claim 1, wherein at least one of the plurality of floors has a first dimension on a first side of the satellite and a second dimension on a second side of the satellite, the first dimension being different than the second dimension.

3. The satellite according to claim 1, wherein the depth $Ymc_R$ is 2.5 m, and the width $Xmc_R$ varies between 2.1 and 2.8 m.

4. The satellite according to claim 2, wherein the depth $Ymc_R$ is equal to 2.5 m and the width $Xmc_R$ varies between 2.1 and 2.8 m.

5. The satellite according to claim 1, wherein the repeater module has a width of 2.4 m and a depth of 2.5 m.

6. The satellite according to claim 1, wherein the one or more antennas are arranged in an east-west direction when the satellite is in an orbit configuration.

7. The satellite according to claim 1, further comprising solar panels arranged in proximity to the south and north panels in a launch phase.

8. The satellite according to claim 7, wherein the solar panels are deployed in a north or south direction in an orbital configuration.

* * * * *